United States Patent
Pappalardo et al.

(10) Patent No.: US 6,954,743 B2
(45) Date of Patent: Oct. 11, 2005

(54) OPTIMIZED METHOD OF COMPUTING THE DEGREE OF MEMBERSHIP OF A FUZZY VARIABLE, AND A CALCULATOR CIRCUIT IMPLEMENTING THE METHOD

(75) Inventors: Francesco Pappalardo, Paternò (IT); Biagio Giacalone, Trapani (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 573 days.

(21) Appl. No.: 09/969,500

(22) Filed: Oct. 1, 2001

(65) Prior Publication Data
US 2002/0052857 A1 May 2, 2002

(30) Foreign Application Priority Data
Oct. 2, 2000 (IT) .................................... MI2000A2124

(51) Int. Cl.[7] .............................. G06F 15/18; G06G 7/00
(52) U.S. Cl. .................................. 706/7; 706/4; 706/1
(58) Field of Search .................................. 706/7, 4, 1

(56) References Cited

U.S. PATENT DOCUMENTS

| | | | | |
|---|---|---|---|---|
| 5,764,855 A | * | 6/1998 | Kunemund | 706/4 |
| 6,188,998 B1 | * | 2/2001 | Cucé et al. | 706/7 |
| 6,347,308 B2 | * | 2/2002 | Le Van Suu | 706/4 |
| 6,424,957 B1 | * | 7/2002 | Matranga et al. | 706/8 |
| 6,430,544 B1 | * | 8/2002 | Childress | 706/1 |

* cited by examiner

Primary Examiner—Joseph P. Hirl
(74) Attorney, Agent, or Firm—Lisa K. Jorgenson; E. Russell Tarleton; Seed IP Law Group PLLC

(57) ABSTRACT

An optimized method of computing the value of the degree of membership of a fuzzy variable defined within a universe of discourse that is discreted into a finite number of points by way of a membership function thereof, wherein the membership function is quantified into a finite number of levels corresponding to a finite number of degrees of truth, and is stored as a characteristic value of each subset of fuzzy variable values being all mirrored in one value of said degree of membership corresponding to one of said levels. The computing method includes generating a binary sequence; generating an address signal from the bits in the binary sequence; reading the contents of the memory storing the membership functions at each address signal to obtain a characteristic value; and comparing the characteristic value with the value of a fuzzy input variable. These steps are repeated until a characteristic value is found that is equal to or greater than the value of the fuzzy input variable, the degree of membership sought being correlated with the address value of the characteristic value.

29 Claims, 7 Drawing Sheets

US 6,954,743 B2

OPTIMIZED METHOD OF COMPUTING THE DEGREE OF MEMBERSHIP OF A FUZZY VARIABLE, AND A CALCULATOR CIRCUIT IMPLEMENTING THE METHOD

BACKGROUND OF THE INVENTION

1. Field of the Invention

The present invention relates to a method of computing the degree of membership of a fuzzy variable relative to a membership function thereof.

Specifically, the invention relates to a method of computing the value of the degree of membership of a fuzzy variable defined within a universe of discourse that is discreted into a finite number of points relative to a membership function thereof, wherein the membership function is quantified into a finite number of levels corresponding to a finite number of degrees of truth and is stored by way of a characteristic value of each subset of fuzzy variable values being all mirrored in one value of said degree of membership corresponding to one of said levels.

The invention also relates to a calculator circuit for carrying into effect the inventive method.

2. Description of the Related Art

As is well known, a membership function (hereinafter also designated MF) is a single-variable function, and accordingly, can be expressed by a two-dimensional graph.

In particular, a membership function MF represents the degree of membership, MF(x), of a fuzzy variable x, and can be described by a graph where the fuzzy variable x is plotted along one axis and its degree of membership, hereinafter designated $\alpha$, is plotted along the other axis.

Encoding the membership function MF has been an object of investigation because it uses up a large amount of memory area, for instance when the membership functions MF are to be stored into a calculator structure.

Especially with a digital calculator structure, a much-needed simplification consists in the first place of discreting the membership functions MF for integer values of the fuzzy variable x within the so-called universe of discourse (U.d.D.).

In particular, each membership function MF is defined at 0 to $2^n-1$ levels, i.e., discreted into n bits.

Several techniques are known for storing membership functions MF.

A first conventional method uses a table for storing the value of the membership function MF point by point, meaning that a degree $\alpha$ of membership, corresponding to each discreted value of the fuzzy variable x, is stored.

This method has a major advantage in that membership functions MF of any forms can be stored, and another advantage in that the degrees $\alpha$ of truth can be extracted from a given fuzzy variable x at a fast rate.

It has, however, a serious disadvantage in that the punctual storing of all the membership functions MF involved claims a large amount of memory area.

Also known is to reduce the representable set of membership functions MF to a subset containing only certain geometric figures, and under this constraint, to use parameters for storing the membership functions MF. In particular, the degree $\alpha$ of membership of a membership function MF can be computed from these parameters as a function of the fuzzy variable x, and much memory area be saved.

This is accompanied, though, by a drastic reduction in the membership functions MF that can be represented accurately, i.e., easily led back to the admitted subset of geometric figures.

One such method of membership function encoding and storing is disclosed, for instance, in U.S. Pat. No. 5,875,438, granted on Feb. 23, 1999.

In addition, solutions of this kind require the provision of complicated hardware for computing the degree $\alpha$ of membership from a given fuzzy variable x, and long computation times for computing the degrees $\alpha$ of truth.

Known is also a method of encoding and storing membership functions MF, wherein the values of the degree $\alpha$ of membership of a membership function MF are stored in a table whose address is indicative of the degree $\alpha$ of membership. Stored in this table for each address value is a maximum, tantamount minimum value in a subset of membership degree values representing all the fuzzy variable values that are mirrored by the same value of the degree $\alpha$ of membership.

This membership function encoding and storing method forms the subject matter of a co-pending European patent application by this Applicant.

The membership function MF is split into a first or non-decreasing monotone part and a second or non-increasing monotone part, as shown schematically in FIG. 1. In addition, the membership function MF is quantified into a series of subsets that correspond graphically to horizontal segments, each having the same value $\alpha$ corresponding to said subset of values for the fuzzy variable x.

Starting with the non-decreasing monotone part, i.e., from point 0, those subsets of values which give the value $\alpha$ for a result are created for the universe of discourse, and their minima considered.

Let it be, for the first or non-decreasing monotone part:

$x0$ the minimum value in the set of values of the fuzzy variable, $x[x, x1[$, whereby $\alpha=0$;

$x1$ the minimum value in the set of values of $x[x1, x2[$ whereby $\alpha=1$;

and so on to xk, being the minimum value in the set of values of $x[xk, x(k+1)[$ whereby $\alpha=k$, i.e., the highest degree of membership max;

and for the second or non-increasing monotone part:

$x_{(k+1)}$ the minimum value in the set of values of the fuzzy variable, $X[X_{(k+1)}, X_{(k+2)}[$ whereby $\alpha=(k-1)$;

$X_{(k+2)}$ the minimum value in the set of values of $x[x_{(k+1)}, x_{(k+2)}[$ whereby $\alpha=(k-2)$;

and so on to $x_{2k}$, being the minimum value in the set of values of $x[x_{(2k)}, max]$ whereby $\alpha=(k-k)=0$, i.e., the lowest degree of membership.

The first value $x_0$ is known beforehand from that it coincides with the lowest value in the universe of discourse U.d.D., usually equal 0.

In this way, the universe of discourse is split into a number of contiguous ranges ($[x_i, x_{(i+1)}[$), each having a single value of the degree of membership, $MF(x_1)=\alpha_i$, where $x_i$ is the lowest value of the fuzzy variable x within that range, associated therewith.

The membership function MF can now be encoded and stored into a membership function storage memory MMF, with $x_0$ being stored at address 0, $x_1$ at address 1, and so on to $x_k$, which is stored at address k.

In a similar manner, $x_{(k+1)}$ is stored at address k+1, $x_{(k+2)}$ stored at address k+2, and so on to $X_{2k}$, which is stored at address 2k, as shown schematically in FIG. 2.

Notice that the values $x_0, x_1, x_2, \ldots, x_{(2k-1)}, X_{2k}$ are not continuous values, but rather discrete values included between 0 and the highest value max in the universe of discourse U.d.D. For example, with values of the degree of membership within the range of 0 to 3 and values of the universe of discourse U.d.D. within the range of 0 to 16, the following values are obtained:

$x_0=0, x_1=4, x_2=5, x_3=8, x_4=10, x_5=13$ and $x_6=15$.

The aforementioned patent application also discloses a method of computing the degree $\alpha$ of membership that corresponds to the degree of membership of the value $x_{ing}$ of said fuzzy input variable, which method comprises reading sequentially from the memory MMF until a characteristic value $x_m$, contained in the memory MMF, is found whereby the first values are higher than or equal to the value of a fuzzy input variable $x_{ing}$, the location of the value $x_m$ in the memory MMF being correlated with the value of the degree $\alpha$ of membership sought.

In particular, the computation time of the corresponding calculator circuit described in that European patent application is a multiple of the clock frequency of the internal counter of the calculator circuit. Thus, assuming the highest degree of membership to be $k=(2^n-1)$, computing the degree of membership for a given value of the fuzzy input variable $x_{ing}$ will require a time equal to 2k+1 clock beats, i.e., the time needed for the counter output signal to reach that maximum value.

In other words, the time for computing the degree of membership of a fuzzy input variable $x_{ing}$ is directly proportional to the degree of membership, meaning that the more the bits needed to represent that degree of membership, the more will be the memory words needed to store the membership functions MF and the longer the time taken to compute the degree $\alpha$ of membership tied to the fuzzy input variable $x_{ing}$.

The size of the memory MMF storing the membership functions MF will be dictated by the universe of discourse U.d.D. and the magnitude of the highest degree of membership. Mathematically, assuming the universe of discourse U.d.D. to be represented by n bits and a degree of membership by p bits, with $k=2^P-1$, the membership function storing table will have (2k+1) rows of n bits each.

With the calculator circuit described in the aforementioned European patent application, whereby the largest of the ranges is stored, the membership function storing table is read serially. In particular, the counter in the calculator circuit will keep generating read addresses to the table until a stored value $x_m$ equal to or higher than the value of the fuzzy input variable $x_{ing}$ is read, the location of this value in the table being correlated with the value of the degree $\alpha$ of membership sought.

In particular, the degree $\alpha$ of membership is computed from the address ADD according to the following relations:

$\alpha=ADD$ if $ADD \leq 2^P-1$, and $\alpha=ADD-2^P+1$ if $ADD>2^P-1$.

The computation time, therefore, amounts to (2k+1) read accesses to the memory MMF for the membership functions MF, with $k=2^P-1$.

The underlying technical problem of this invention is to provide an optimized method of computing the value of the degree MF(x) of membership of a fuzzy variable by way of its membership function MF, wherein the computation time is reduced and the limitations of the computing method according to the prior art are overcome.

BRIEF SUMMARY OF THE INVENTION

The solvent idea of the technical problem is achieved, according to the invention, by generating the following type of a binary sequence N:

N=100 . . . 0, 110 . . . 0, 111 . . . 0, . . . , 111 . . . 1 from which an address signal can be computed to read the contents of the membership function memory, and a corresponding degree of membership obtained, without the memory having to be read sequentially.

Based on this idea, the technical problem is solved by a method of computing the degree $\alpha$ of membership of a fuzzy variable by way of its membership function MF. The method includes generating a binary sequence of bits; generating an address signal from the bits in the binary sequence; reading the contents of the memory storing the membership functions on the occurrence of each address signal to obtain a characteristic value; comparing the characteristic value with the value of a fuzzy input variable; and repeating the foregoing steps until a characteristic value is found that is equal to or greater than the value of the fuzzy input variable, the degree of membership $\alpha$ sought being correlated with the address value ADD of the characteristic value according to the following relation:

$\alpha=ADD$ when $ADD \leq 2^P-1$, and $\alpha=ADD-2^P+1$ when $ADD>2^P-1$, where p is the number of levels corresponding to a finite number of degrees of truth.

The technical problem is further solved by an optimized calculator circuit for computing the degree $\alpha$ of membership of a fuzzy variable by way of its membership function MF. The calculator circuit includes a memory table containing characteristic values of each subset of values of fuzzy variables being mirrored in one value of the degree of membership; a comparator connected to the input site of the table; a sequence generator having a clock terminal to receive a clock signal, a reset terminal to receive a reset signal, and an output terminal to supply a binary sequence; and an address generator by algorithm having an input terminal connected to the output terminal of the sequence generator, the sequence generator generating at each beat of the clock signal the binary sequence supplied to the address generator, the address generator generating an address signal to the table for reading the table of contents on the occurrence of the address signal and obtaining the characteristic value contained therein.

BRIEF DESCRIPTION OF THE SEVERAL VIEWS OF THE DRAWINGS

The features and advantages of the method and the calculator circuit according to the invention will appear from the following description of embodiments thereof, given by way of non-limitative examples with reference to the accompanying drawings.

In the drawings.

DETAILED DESCRIPTION OF THE INVENTION

Figure 1:
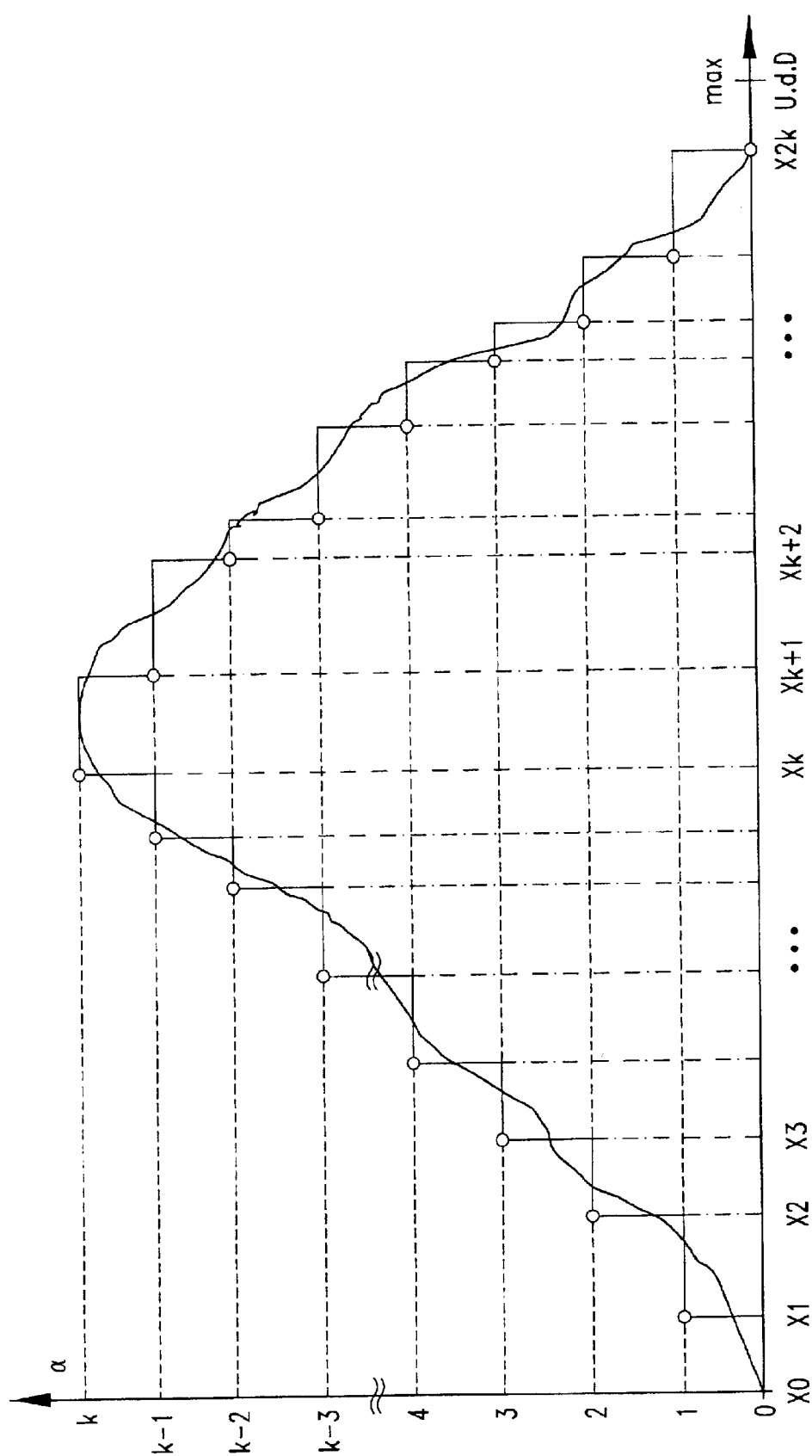
FIG. 1 illustrates a membership function MF as discreted and quantified for storing by a first conventional method.
Figure 2:
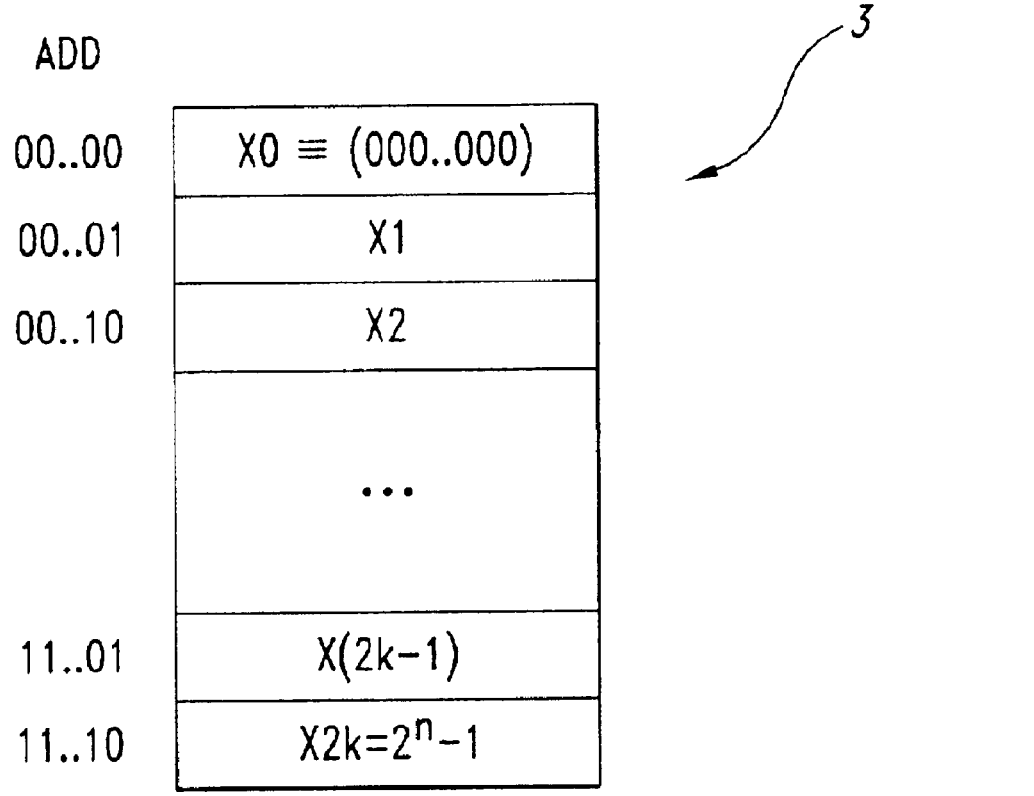
FIG. 2 shows schematically a memory table for storing up the membership function MF of FIG. 1.

With reference to the encoding and storing method described hereinabove, a method of computing the value of the degree $\alpha$ of membership will be described, which is quite simple and can be carried out on hardware of moderate size. In particular, reference is made to storing the minimum values in the ranges that comprise the universe of discourse U.d.D.

As said before, the size of the memory MMF for the membership functions MF is dependent on the size of the universe of discourse U.d.D. and the highest possible value of the degrees of truth.

Assume the universe of discourse U.d.D to be represented with n bits, and the degree of membership with p bits. Given that $k=2^p-1$, a memory having (2k+1) rows of n bits will be employed to represent a membership function MF by the above encoding and storing method.

Advantageously, in accordance with an embodiment of this invention, a method of computing the degree $\alpha$ of membership of a fuzzy variable by way of its membership function MF, wherein the membership function MF is encoded and stored into a memory MMF as previously described, is provided.

Specifically, the computing method of this invention comprises generating a binary sequence N of the following type:

N=100 ... 0, 110 ... 0, 111 ... 0, ... 111 ... 1 after an appropriate reset signal RST is received, which signal gives the start to the computing of the degree $\alpha$ of membership that corresponds to a fuzzy input variable $x_{ing}$.

The binary sequence N is generated, from the value 100 ... 0 to the value 111 ... 1, by increasing the "1's", from left to right at each beat of the clock signal CLK, so as to propagate a value "1" from the most significant bit (MSB) to the least significant bit (LSB).

The bits in the binary sequence N are processed by the following algorithm, to obtain an address signal ADD:

assuming ADD to be a binary number of i=(p+1) bits, ADD(i)=MSB, ADD(0)=LSB, and S an internal position signal,

```
          if N=100...00    ⟹  S=i
otherwise if N=110...0     ⟹  S=i-1
otherwise if N=111...00    ⟹  S=i-2
          ...
otherwise if N=111...10    ⟹  S=1
otherwise                  ⟹  S=0
moreover:
    if CTRL=1              ⟹  ADD(S)=0
    otherwise              ⟹  ADD(S)=1
``` where CTRL is a control signal of the computation sequence.

The address signal ADD is used for reading the contents of the memory MMF storing the membership functions MF; a characteristic value $x_m$ contained in the range $[x_0, x_{2k}]$ will be obtained at each address ADD.

This characteristic value $x_m$ will correspond to the smallest or the largest of the ranges comprising the universe of discourse U.d.D., according to the storage method being used. In the instance under consideration, the characteristic value $x_m$ corresponds to the smallest of said ranges.

This characteristic value $x_m$ is compared with the value of the fuzzy input variable $x_{ing}$, and the binary sequence N is increased up to a characteristic value $x_m$ which is equal to or greater than the value of the fuzzy input variable $x_{ing}$.

In particular, the control signal CTRL and a blocking signal BL to interrupt generation of the binary sequence N are generated based on the result of said comparison.

At the end of the search, the address signal ADD will include the location of the range sought in the memory MMF, whence the value of the degree $\alpha$ of membership can be computed conventionally. In particular, the degree $\alpha$ of membership is computed from the address signal ADD by the following relations:

$\alpha$=ADD if ADD$\leq 2^p-1$, and $\alpha$=ADD$-2^p+1$ if ADD$>2^p-1$.

Briefly, the method of computing the degree of membership, according to this invention, comprises no sequential reading from the membership function memory but starts from a middle position, thereby reducing to p+1 the number of steps required in order to find the desired value.

Advantageously, the method of computing the degree of membership, according to this embodiment of the invention, provides for the use of a polarity signal POL to enable computation of the value of the degree $\alpha$ of membership or a negated value $\alpha'$ of the degree of membership, according to the following criteria:

when the polarity signal is null (POL=0), compute the value of the degree $\alpha$ of membership;

when the polarity signal is one (POL=1), compute the negated value $\alpha'$ of the degree of membership.

It should be noted that, to compute the information sought, i.e., the value $\alpha$ or its negation $\alpha'$, the following rules apply:

if the input $x_{ing}$ occurs within the non-decreasing monotone part of the membership function MF, then the value ADD is coincident with the value $\alpha$;

if the input $x_{ing}$ occurs within the non-increasing monotone part of the membership function MF, then the value (ADD$-2^p+1$) is coincident with the negated value $\alpha'$.

The negated value $\alpha'$ is defined notionally as the highest value of the degree of membership from which the value $\alpha$ is subtracted, i.e.,:

$\alpha'$=(Max degree of membership)$-\alpha$.

In the binary system, assuming the highest value of the degree of membership to be coincident with the highest value that can be represented by the available bits (a condition always adopted in order to optimize fuzzy systems), the negated value $\alpha'$ may be simply computed by negating the value $\alpha$ bit by bit, and correspondingly, the value $\alpha$ computed by inverting the negated value $\alpha'$ bit by bit.

A calculator circuit 10, implementing the computing method of this invention, will now be described with reference in particular to FIG. 3.

This calculator circuit 10 is used to compute, from the value of the fuzzy input variable $x_{ing}$, either the value of the degree α of membership or its negated value α', according to a polarity signal, and advantageously in this invention, has a computation time equivalent to (p+1) read accesses to the memory MMF storing the membership functions MF, with k=$2^P$−1 at the highest value of the degree of membership that can be represented with p bits.

Advantageously in this invention, the computation time is shorter than the computation time of conventional devices, being in particular equal to p+1, i.e., less than half the computation time of the calculator circuit described in the co-pending European patent application by this Applicant.

The calculator circuit 10 of this invention comprises basically a sequence generator 1, which is cascade-connected to an address generator 2 by algorithm, in turn cascade-connected to a table 3 corresponding to the memory MMF storing the membership functions MF.

In particular, the sequence generator 1 has a clock terminal CLK1, a reset terminal RST1 receiving a reset signal RST, and an output terminal N1, the latter being connected to a corresponding input terminal N2 of the address generator 2 by algorithm.

The address generator 2 by algorithm has a clock terminal CLK2 arranged to receive a clock signal CLK, a reset terminal RST2 to receive the reset signal RST, a control terminal C2, and an output terminal P2 connected to the table 3 containing the minima of the ranges [$x_i, x_{j+1}$] and being adapted to supply an address signal ADD.

The calculator circuit 10 further comprises a comparator 4 receiving, on a first input A, the value of the fuzzy input variable $x_{ing}$, and receiving, on a second input B, the characteristic value $x_m$=MMF(ADD) read from the table 3 at the address ADD provided by the address generator 2.

The comparator 4 also has a first output terminal C connected, through a first logic inverter NOT1, to the control terminal C2 of the address generator 2 by algorithm, and has a second output terminal D connected to an input terminal of a logic gate 5 through a second logic inverter NOT2. The first output terminal C supplies a control signal CTRL, and the second output terminal D a blocking signal BL.

In particular, the logic gate 5 is an AND logic gate, receiving the clock signal CLK on another input terminal and having an output terminal connected to the clock terminal CLK1 of the sequence generator 1.

The comparator 4 operates according to the following logic (where the input and output terminals are specified instead of the signals, for simplicity):

| if A<B | ⟹ | C=1 |
|---|---|---|
| otherwise | ⟹ | C=0 |
| if A=B | ⟹ | D=1 |
| otherwise | ⟹ | D=0. |

The control signal CTRL at the output terminal C is stored and used by the address generator 2 for the next address computations, and the blocking signal BL at the output terminal D is effective to stop the clock signal CLK through the logic gate 5 when the signal read from the table 3, upon the occurrence of the address signal ADD on the input terminal B, corresponds to the value of the fuzzy input variable $x_{ing}$ at the input terminal A.

In other words, the calculator circuit 10 of this invention allows the range ([$x_{(i-1)}, x_i$[), containing the fuzzy input variable $x_{ing}$, to be found within a number p+1 of clock beats.

Figure 4:
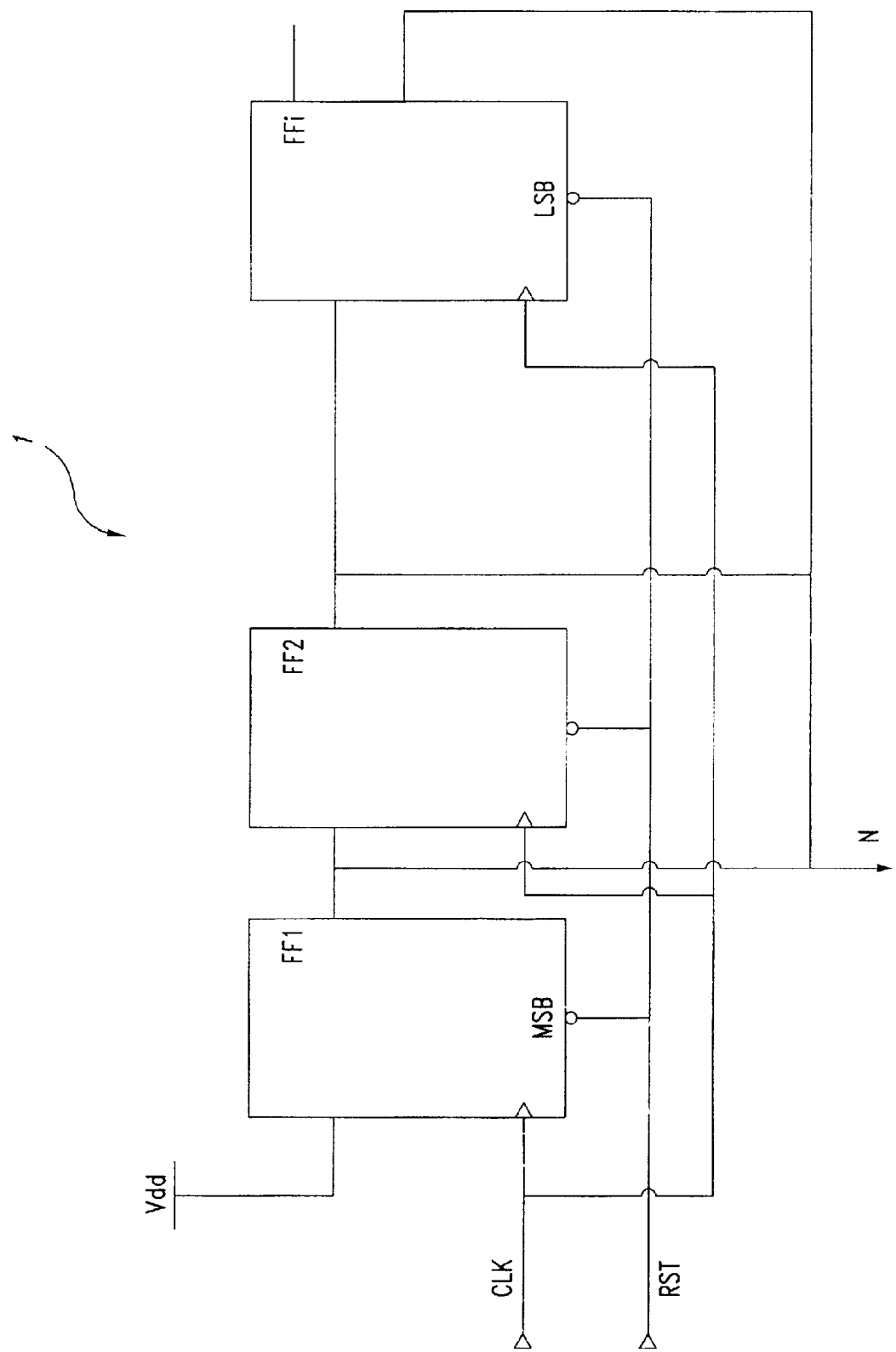
FIG. 4 is a detail view of the calculator circuit shown in FIG. 3.

More precisely, the sequence generator 1 comprises a plurality of cascaded flip-flops FF1, ..., FFi, as shown schematically in FIG. 4. In particular, said plurality of flip-flops FF1, ..., FFi are all supplied a supply voltage Vdd and input the clock signal CLK and reset signal RST, and will output a binary sequence N of bits, as follows:

N=100 ... 0, 110 ... 0, 111 ... 0, 111 ... 1.

In other words, the sequence generator 1 generates a binary sequence N, from value 100 ... 0 to value 111 ... 1, by increasing the "1's" from left to right at each beat of the clock signal CLK, through the flip-flop chain FF1, ..., FFi. On the occurrence of the reset signal RST, these flip-flops will store and propagate an input value "1", from the most significant bit MSB to the least significant bit LSB.

The outputs from the flip-flop plurality FF1, ..., FFi are combined, in an AND type of logic, with the corresponding bits of the binary sequence N, thereby providing address signals IND.

Figure 5:
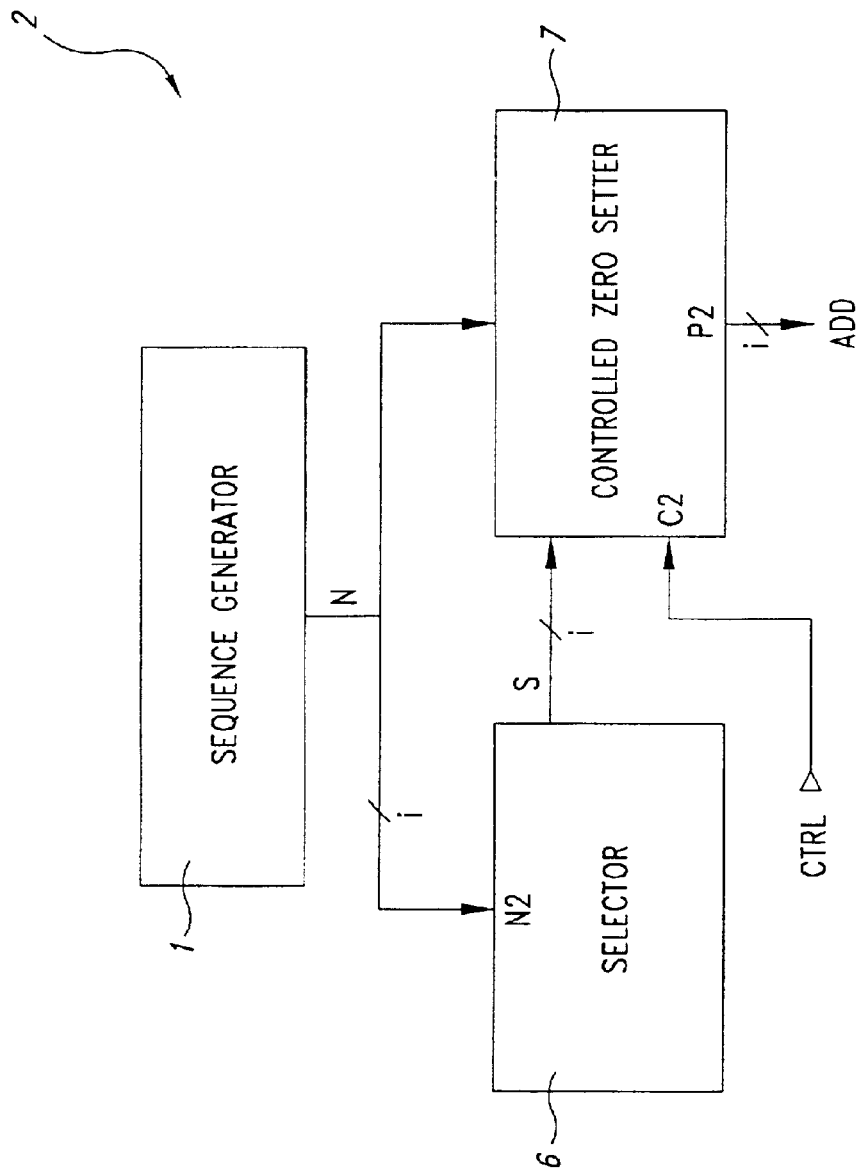
FIG. 5 is another detail view of the calculator circuit shown in FIG. 3.

In particular, and as shown schematically in FIG. 5, the binary sequence N is fed to the address generator 2, which operates by the following algorithm:

assuming ADD to be a binary number of i bits, ADD(i)= MSB, ADD(0)=LSB, and S a position signal internal of the address generator 2,

| if N=100...00 | ⟹ | S=i |
|---|---|---|
| otherwise if N=110...00 | ⟹ | S=i-1 |
| otherwise if N=111...00 | ⟹ | S=i-2 |
| ... | | |
| otherwise if N=111...10 | ⟹ | S=1 |
| otherwise | ⟹ | S=0 |
| moreover: | | |
| if C2=1 | ⟹ | ADD(S)=0 |
| otherwise | ⟹ | ADD(S)=1. |

An example of an address generator 2 using the above algorithm is shown schematically in FIG. 5. The address generator 2 comprises a selector 6 arranged to receive the binary sequence N and to generate the internal location signal S, comprising a sequence of 0's and one 1 at the location to be read, and comprises a controlled zero setter 7 arranged to receive the internal position signal S and the control signal CTRL.

In particular, the controlled zero setter 7 either leaves a value 1 or resets the output of a selected flip-flop FFn through the selector 6, according to the value of the control signal CTRL.

Figure 6:
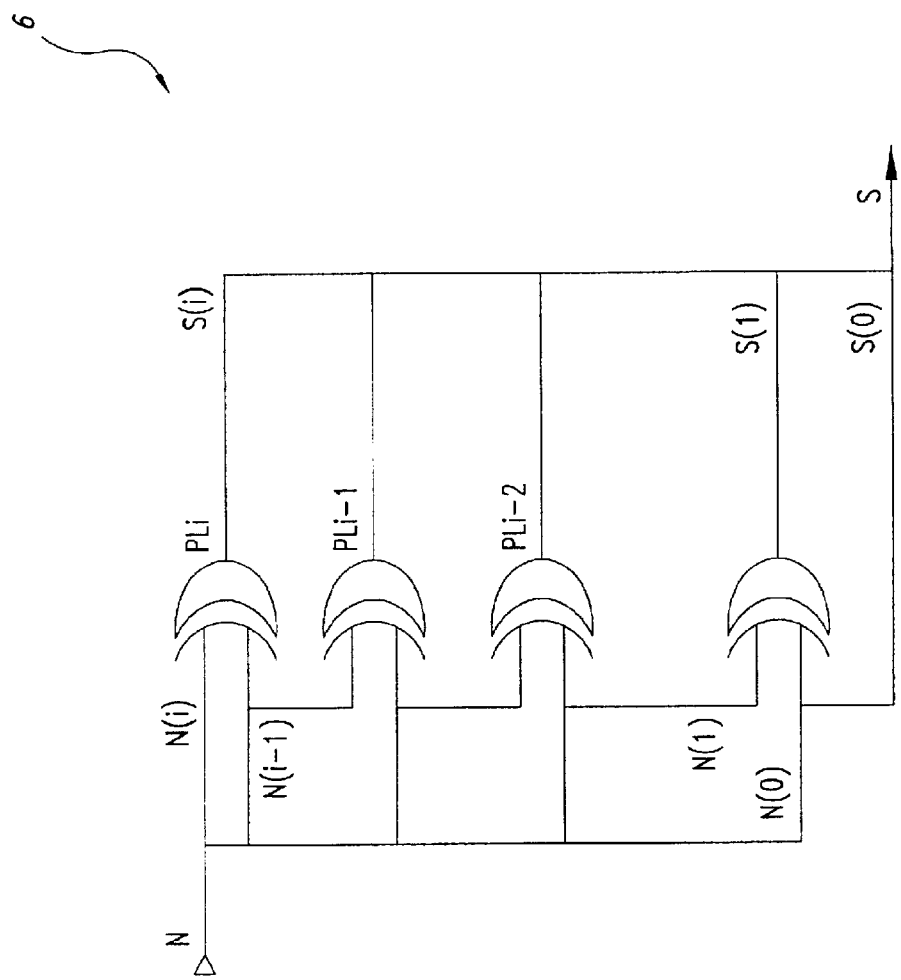
FIG. 6 is a detail view of the circuit shown in FIG. 5.
Figure 7:
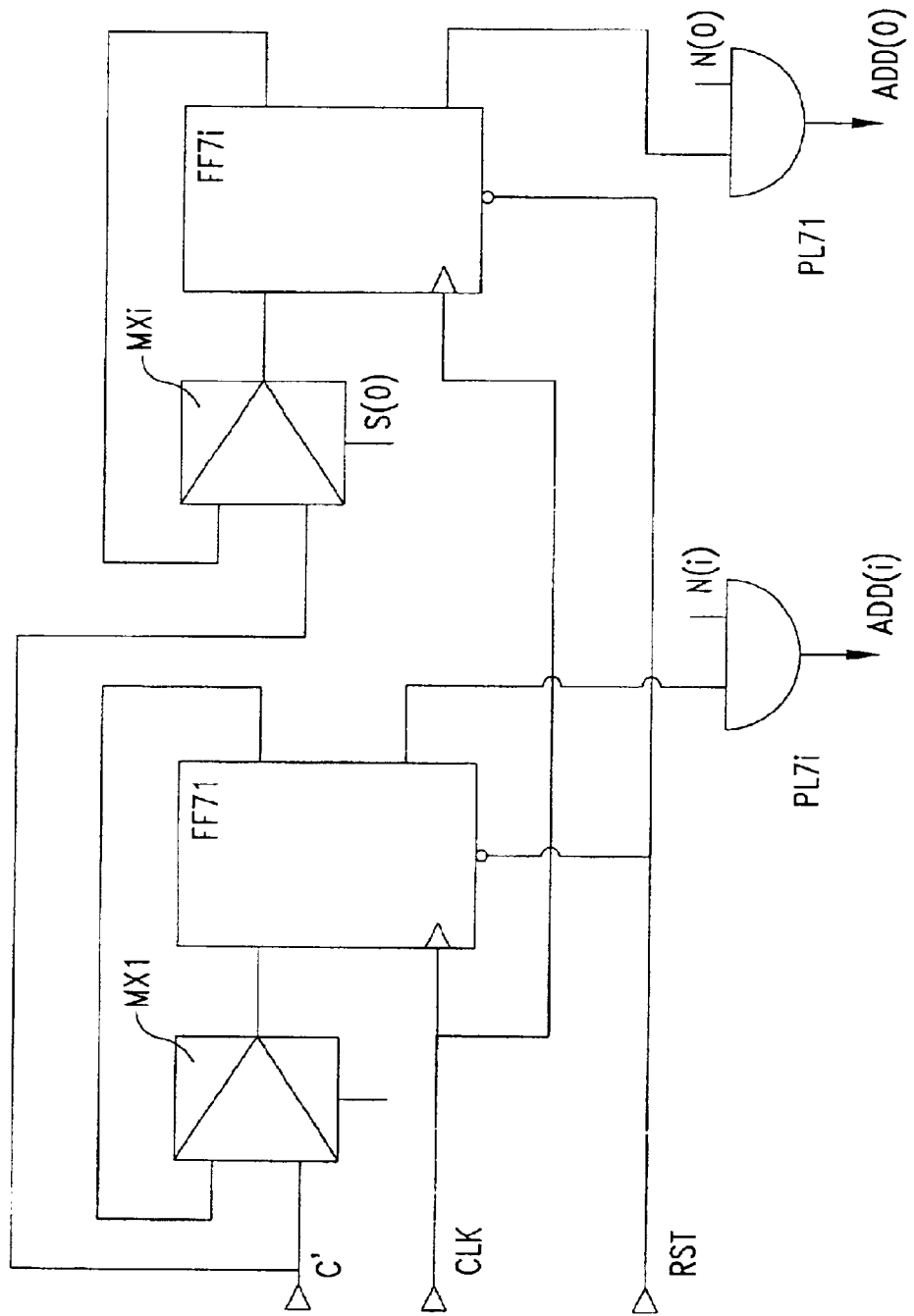
FIG. 7 is another detail view of the circuit shown in FIG. 5.

Embodiments of the selector 6 and the controlled zero setter 7, which comprise logic gates and flip-flops, are shown in FIGS. 6 and 7 by way of examples.

In particular, the selector 6 shown in FIG. 6 comprises a plurality of logic gates PL1, ..., PLi being input the binary sequence N and outputting the internal position signal S.

The controlled zero setter 7 shown in FIG. 7 comprises a plurality of flip-flops FF71, ..., FF7i, having a first input terminal connected to one of a plurality of multiplexers MX1, ..., MXi, a second input terminal receiving the clock signal CLK, a first output terminal connected to an input terminal of said multiplexers MX1, ..., MXi, a second output terminal connected to a plurality of logic gates PL71, ..., PL7i, and a control terminal receiving the reset signal RST.

The multiplexers MX1, ..., MXi have another input terminal to receive a signal C', which signal is the value of the signal at the output terminal C of the comparator 4 as negated through the first logic inverter NOT1, and have a control terminal to receive the internal position signal S from the selector 6.

The logic gates PL71, ..., PL7i are AND gates receiving, on another input terminal, the binary sequence N, and providing, on an output terminal, the address signal ADD.

The operation of the calculator circuit 10 will now be described.

The sequence generator 1, after receiving a suitable reset signal RST indicating the start of the step of computing the degree α of membership corresponding to a fuzzy input variable $x_{ing}$, will begin to generate the binary sequence N at each beat of the clock signal CLK.

This binary sequence N is filtered through the address generator 2, the latter generating an address ADD to the table 3, whereby the contents of the memory MMF is read at the address ADD and the characteristic value $x_m$=MMF(ADD) obtained.

The characteristic value $x_m$ from the table 3 is input to the comparator 4, and the comparator 4 compares its value with the value of the fuzzy input variable $x_{ing}$, and generates accordingly the control signal CTRL to the output terminal C of the comparator 4 and the blocking signal BL to the output terminal D of the comparator 4.

At the end of the search, the address signal ADD will contain the location in the table 3, and therefore in the memory MMF, of the range sought, from which the value of the degree α of membership can be computed, as explained before in connection with conventional calculator circuits.

In particular, it will be recalled that the following rule applies to computing the information sought, i. e., the value α or its negation α':

if the input $x_{ing}$ lies in the non-decreasing monotone part of the membership function MF, then the address signal ADD coincides with the value α;

if the input $x_{ing}$ lies in the non-increasing monotone part of the membership function MF, then the value (ADD−2p+1) coincides with the value α.

It should be noted that the negated value α' is defined notionally as the highest value of the degree of membership from which the value α is subtracted or, expressed in formulae:

α'=(Max degree of membership)−α.

Assuming that in a binary representation the highest value of the degree of membership is coincident with the highest value that can be represented by the available bits (this being a condition that is always adopted in order to optimize fuzzy systems), the negated value α' can be simply computed by negating the value α bit by bit, and conversely, the value α can be computed by inverting the negated value α' bit by bit.

In addition, the applicability of the computing method of the invention can be readily extended to include membership functions MF having maxima and minima in larger numbers than one. This is achieved by splitting into several segments having one maximum and one minimum and applying the computation of the value α to each non-increasing or non-decreasing monotone segment.

Figure 3:
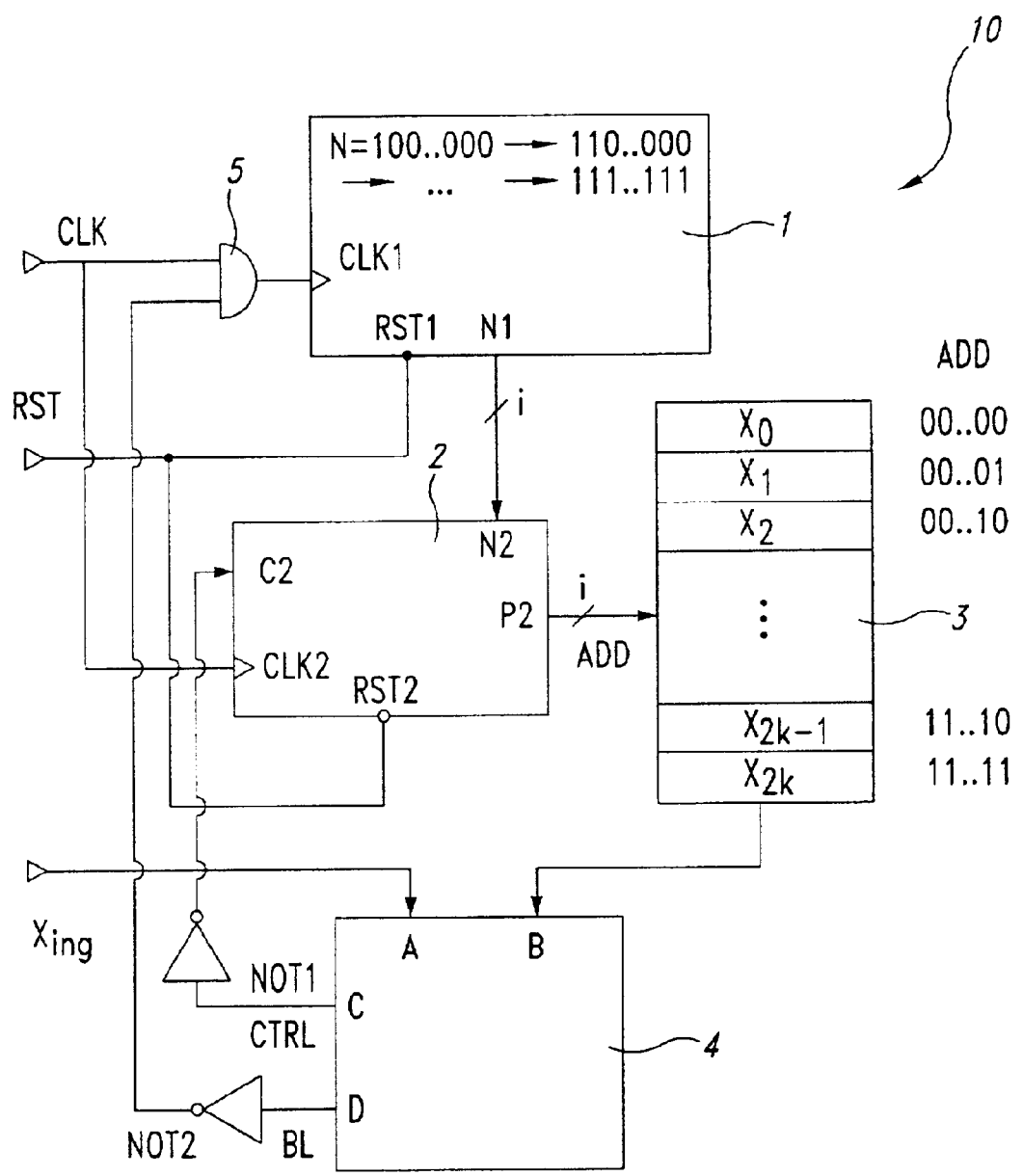
FIG. 3 shows schematically a calculator circuit for carrying out the computing method of this invention.

Finally, it should be noted that the calculator circuit 10, shown schematically in FIG. 3, is but one of many hardware circuits that can carry out the computing method of this invention. For example, by changing the operating propriety of the blocking signal BL that enables the sequence generator 1, a comparator of the A<B type may be used as the block 4.

In conclusion, advantageously according to the invention, the computing method according to the invention takes less time to compute the degree α of membership, corresponding to the value of a given fuzzy variable x, than conventional calculator circuits.

From the foregoing it will be appreciated that, although specific embodiments of the invention have been described herein for purposes of illustration, various modifications may be made without deviating from the spirit and scope of the invention. Accordingly, the invention is not limited except as by the appended claims and the equivalents thereof.

What is claimed:

1. An optimized method implemented in an electronic circuit for computing the value of the degree of membership of a fuzzy variable defined within a universe of discourse that is discreted into a finite number of points by way of a membership function thereof, wherein the membership function is quantified into a finite number of levels (p) corresponding to a finite number of degrees of truth, and is stored in memory by way of a characteristic value of each subset of fuzzy variable values being all included in one value of the degree of membership (α) corresponding to one of the levels, the computing method comprising:

generating a binary sequence of the following type: N=100 . . . 0, 110 . . . 0, . . . , 111 . . . 1;

generating an address signal from the bits in said binary sequence;

reading the contents of the memory storing the membership functions on the occurrence of each address signal to obtain the characteristic value stored therein;

comparing said characteristic value with the value of a fuzzy input variable;

the foregoing steps being repeated until a characteristic value is found that is equal to or greater than the value of the fuzzy input variable, the degree of membership sought being correlated with a memory address value (ADD) of the characteristic value according to the following relation:

α=ADD when ADD≦$2^p$−1, and

α=ADD−$2^p$+1 when ADD>$2^p$1.

2. The encoding and storing method of claim 1, wherein said characteristic value is a minimum value of said subsets.

3. The computing method of claim 1, wherein said binary sequence is generated, from the value 100 . . . 0 to the value 111 . . . 1, by increasing the "1+s" from left to right and propagating a value "1" from a most significant bit to a least significant bit.

4. The computing method of claim 1, wherein the bits in said binary sequence are processed to obtain said address signal using the following algorithm:

configuring ADD to be a binary number of i bits, ADD(i)=MSB, ADD(0)=LSB, and S a position signal internal of the address generator 2, when N=100...00 then S=i,
otherwise when N=110...00 then S=i-1,
otherwise when N=111...00 then S=i-2,
...
otherwise when N=111...10 then S=1,
otherwise S=0,
and:
   when CTRL=1 then ADD(S)=0,
otherwise ADD(S)=1, where CTRL is a control signal of the computation sequence.

5. The computing method of claim 1, wherein a control signal and a blocking signal are generated, based on the results of said comparing step, to interrupt said step of generating said binary sequence.

6. The computing method of claim 1, wherein said step of generating said binary sequence is started after a reset signal, indicating the start of the step of computing the degree of membership, is received.

7. The computing method of claim 1, comprising providing a polarity signal to enable computation of either said value of the degree of membership or a negated value of said value of the degree of membership, according to the following criteria:

when the polarity signal is null, compute the value of the degree of membership; and when the polarity signal is one, compute the negated value of the degree of membership.

8. A calculator circuit for computing the degree ($\alpha$) of membership of a fuzzy variable defined within a universe of discourse discreted into a finite number of points by way of a membership function thereof, comprising:

a memory containing characteristic values of corresponding subsets of values of fuzzy variables being minored in one value of said degree of membership;

a comparator connected to the input side of said memory;

a sequence generator having a clock terminal to receive a clock signal, a reset terminal to receive a reset signal, and an output terminal to supply a binary sequence; and an address generator having an input terminal connected to said output terminal of the sequence generator;

said sequence generator generating at each beat of the clock signal said binary sequence supplied to the address generator, said address generator generating an address signal to the memory for reading the memory contents on the occurrence of said address signal and obtaining the characteristic value contained therein, and said comparator comparing the characteristic value to the fuzzy variable value to select a characteristic value equal to or greater than the value of the fuzzy variable value, and the degree $\alpha$ of membership is correlated to the address of the selected characteristic value.

9. The calculator circuit of claim 8, wherein said address generator has a clock terminal receiving said clock signal, a reset terminal receiving said reset signal, a control terminal, and an output terminal connected to the table and arranged to supply said address signal.

10. The calculator circuit of claim 9, wherein said comparator has:

a first input to receive the value of the fuzzy input variable;

a second input to receive said characteristic value as read from the memory on the occurrence of the address signal supplied by the address generator;

a first output terminal arranged to supply a control signal and connected to said control terminal of the address generator through a first logic inverter; and a second output terminal arranged to supply a blocking signal.

11. The calculator circuit of claim 10, comprising a logic gate, receiving as input said blocking signal and said clock signal through a second logic inverter and having an output terminal connected to the clock terminal of said sequence generator.

12. The calculator circuit of claim 10, wherein said comparator is configured to function on the following logic:

if A<B, then C=1, otherwise C=0;

if A=B then D=1, otherwise D=0, wherein:

A represents the fuzzy variable value,

B represents the address signal ADD,

C represents the control signal,

D represents the blocking signal.

13. The calculator circuit of claim 10, wherein said controlled zero setter comprises a plurality of flip-flops having a first input terminal connected to a plurality of multiplexers, a second input terminal to receive said clock signal, a first output terminal connected to an input terminal of said multiplexers, a second output terminal connected to a plurality of logic gates, and a control terminal to receive said reset signal, said multiplexers having an additional input terminal to receive a signal, said signal corresponding to the negated value of said control signal on the first output terminal of said comparator, and having a control terminal to receive said internal position signal from said selector, with said logic gates receiving said binary sequence on another input terminal and supplying said address signal on an output terminal.

14. The calculator circuit of claim 8, wherein said sequence generator comprises a plurality of cascaded flip-flops, being supplied with a common supply voltage and receiving as input said clock and reset signals, and outputting said binary sequence of bits of the following type:

N=100 . . . 0, . . . 110 . . . 0, 111 . . . 0, . . . , 111 . . . 1.

15. The calculator circuit of claim 8, wherein said address generator includes a selector arranged to receive said binary sequence and to generate an internal position signal, said internal position signal comprising a sequence of 0's and a single 1 at the location being read, and includes a controlled zero setter receiving said internal position signal (S) and said control signal (CTRL), said controlled zero setter leaving a value 1 or zeroing the output of a flip-flop selected by the selector according to the value of said control signal.

16. The calculator circuit of claim 15, wherein said address generator works in accordance with the following algorithm:

configuring ADD to be a binary number of i bits, ADD (i)=MSB, ADD(0)=LSB, and S a position signal internal of the address generator 2, if N=100...00 then S=i,
otherwise if N=110...00 then S=i-1,
otherwise if N=111...00 then S=i-2,
...
otherwise if N=111...10 then S=1,
otherwise S=0,
and:
   if C2=1 then ADD(S)=0,
   otherwise ADD(S)=1.

17. The calculator circuit of claim 15, wherein said selector comprises a plurality of logic gates receiving as input said binary sequence and outputting said internal position signal.

18. A method implemented in a calculator circuit for obtaining the value of the degree of membership of a fuzzy variable in memory, the method comprising:

generating a binary sequence of bits;

generating an address signal ADD from the bits in the binary sequence;

reading the contents of a memory in the calculator circuit on the occurrence of each address signal to obtain a characteristic value;

comparing the obtained characteristic value with the value of a fuzzy input variable; and repeating the foregoing steps until a characteristic value is found that is equal to or greater than the value of the fuzzy input variable, the degree of membership α being correlated with the address value ADD of the characteristic value that is a minimum value of the subset of fuzzy variable values according to the following relation:

α=the degree of membership correlated with the address value ADD when ADD≦$2^P$-1, and α=the degree of membership correlated with the address value ADD-$2^P$+1 when ADD>$2^P$1.

19. The computing method of claim 18, wherein the bits in said binary sequence are processed to obtain said address signal using the following algorithm:

configuring ADD to be a binary number of i bits, ADD(i)=MSB, ADD(0)=LSB, and S a position signal internal of the address generator 2, when N=100...00 then S=i,
otherwise when N=110...00 then S=i-1,
otherwise when N=111...00 then S=i-2,
...
otherwise when N=111...10 then S=1,
otherwise S=0,
and:
when CTRL=1 then ADD(S)=0,
otherwise ADD(S)=1, where CTRL is a control signal of the computation sequence.

20. The computing method of claim 18, comprising providing a polarity signal to enable computation of either said value of the degree of membership or a negated value of said value of the degree of membership, according to the following criteria:

when the polarity signal is null, compute the value of the degree of membership; and when the polarity signal is one, compute the negated value of the degree of membership.

21. An electronic method of obtaining the value of the degree of membership of a fuzzy variable that is discreted into a finite number of points by way of a membership function that is quantified into a finite p number of levels corresponding to a finite number of degrees of truth and is stored in a memory by way of a characteristic value of each subset of fuzzy variable values, the method comprising:

generating a binary sequence of bits from the value 100 . . . 0 to the value 111 . . . 1 by increasing the "1's" from left to right and propagating a value "1" from a most significant bit to a least significant bit;

generating an address signal ADD from the bits in the binary sequence;

reading the contents of the memory on the occurrence of each address signal to obtain a characteristic value;

comparing the obtained characteristic value with the value of a fuzzy input variable; and repeating the foregoing steps until a characteristic value is found that is equal to or greater than the value of the fuzzy input variable, the degree of membership α obtained according to the following relation:

α=the degree of membership correlated with the address value ADD when ADD≦$2^P$-1, and α=the degree of membership correlated with the address value ADD-$2^P$+1 when ADD>$2^{P-1}$1.

22. The computing method of claim 21, wherein the bits in said binary sequence are processed to obtain said address signal using the following algorithm:

configuring ADD to be a binary number of i bits, ADD(i)=MSB, ADD(0)=LSB, and S a position signal internal of the address generator 2, when N=100...00 then S=i,
otherwise when N=110...00 then S=i-1,
otherwise when N=111...00 then S=i-2,
...
otherwise when N=111...10 then S=1,
otherwise S=0,
and:
when CTRL=1 then ADD(S)=0,
otherwise ADD(S)=1, where CTRL is a control signal of the computation sequence.

23. The computing method of claim 21, comprising providing a polarity signal to enable computation of either said value of the degree of membership or a negated value of said value of the degree of membership, according to the following criteria:

when the polarity signal is null, compute the value of the degree of membership; and when the polarity signal is one, compute the negated value of the degree of membership.

24. A calculator circuit for computing the degree of membership of a fuzzy variable, comprising:

a memory having stored therein characteristic values of a subset of values of fuzzy variables that are mirrored in one value of the degree of membership;

a sequence generator receiving a clock signal and a reset signal and configured to output on an output terminal a binary sequence of bits that are generated from the value 100 . . . 0 to the value 111 . . . 1 by increasing the "1's" from left to right and propagating a value "1" from a most significant bit to a least significant bit, the sequence generator generating at each beat of the clock signal the binary sequence;

an address generator coupled to the sequence generator and configured to receive the binary sequence of bits and to generate in response thereto an address signal to the memory for reading the memory contents corresponding to the address signal and obtaining the characteristic value stored therein; and a comparator that compares the obtained characteristic value with the value of the fuzzy variable until a characteristic value is found that is equal to or greater than the value of the fuzzy variable, the degree of membership α obtained according to the following relation:

α=the degree of membership correlated with the address value ADD when ADD≦$2^P$-1, and α=the degree of membership correlated with the address value ADD-$2^P$+1 when ADD>$2^P$-1.

25. The calculator circuit of claim 24, wherein said comparator has:
- a first input to receive the value of the fuzzy input variable;
- a second input to receive said characteristic value as read from the memory on the occurrence of the address signal supplied by the address generator;
- a first output terminal arranged to supply a control signal and connected to said control terminal of the address generator through a first logic inverter; and
- a second output terminal arranged to supply a blocking signal.

26. The calculator circuit of claim 25, wherein said comparator is configured to function on the following logic:

if A<B, then C=1,
otherwise C=0;
if A=B, then D=1,
otherwise D=0, wherein:
- A represents the fuzzy variable value,
- B represents the address signal ADD,
- C represents the control signal,
- D represents the blocking signal.

27. The calculator circuit of claim 25, wherein said controlled zero setter comprises a plurality of flip-flops having a first input terminal connected to a plurality of multiplexers, a second input terminal to receive said clock signal, a first output terminal connected to an input terminal of said multiplexers, a second output terminal connected to a plurality of logic gates, and a control terminal to receive said reset signal, said multiplexers having an additional input terminal to receive a signal, said signal corresponding to the negated value of said control signal on the first output terminal of said comparator, and having a control terminal to receive said internal position signal from said selector, with said logic gates receiving said binary sequence on another input terminal and supplying said address signal on an output terminal.

28. The calculator circuit of claim 24, wherein said address generator includes a selector arranged to receive said binary sequence and to generate an internal position signal, said internal position signal comprising a sequence of 0's and a single 1 at the location being read, and includes a controlled zero setter receiving said internal position signal (S) and said control signal (CTRL), said controlled zero setter leaving a value 1 or zeroing the output of a flip-flop selected by the selector according to the value of said control signal.

29. The calculator circuit of claim 28, wherein said address generator works in accordance with the following algorithm:

configuring ADD to be a binary number of i bits, ADD(i)=MSB, ADD(0)=LSB, and S a position signal internal of the address generator 2, if N=100...00 then S=i,
otherwise if N=110...00 then S=i-1,
otherwise if N=111...00 then S=i-2,
...
otherwise if N=111...10 then S=1,
otherwise S=0,
and:
   if C2=1 then ADD(S)=0,
   otherwise ADD(S)=1.

* * * * *

UNITED STATES PATENT AND TRADEMARK OFFICE
CERTIFICATE OF CORRECTION

PATENT NO. : 6,954,743 B2
DATED : October 11, 2005
INVENTOR(S) : Francesco Pappalardo et al.

It is certified that error appears in the above-identified patent and that said Letters Patent is hereby corrected as shown below:

Column 11,
Line 17, "being minored" should read as -- being mirrored --.

Signed and Sealed this

Twenty-fourth Day of January, 2006

JON W. DUDAS
*Director of the United States Patent and Trademark Office*